(12) United States Patent
Beek

(10) Patent No.: US 6,912,455 B2
(45) Date of Patent: Jun. 28, 2005

(54) VEHICLE STEERING SYSTEM AND METHOD OF STEERING

(75) Inventor: Johan van Beek, Sønderborg (DK)

(73) Assignee: Sauer-Danfoss (Nordborg) A/S (DK)

( * ) Notice: Subject to any disclaimer, the term of this patent is extended or adjusted under 35 U.S.C. 154(b) by 65 days.

(21) Appl. No.: 10/455,832

(22) Filed: Jun. 6, 2003

(65) Prior Publication Data

US 2003/0229430 A1 Dec. 11, 2003

(30) Foreign Application Priority Data

Jun. 11, 2002 (DE) .......................................... 102 25 975

(51) Int. Cl.$^7$ .............................................. B62D 5/04
(52) U.S. Cl. ....................................... 701/41; 180/443
(58) Field of Search ..................... 701/41, 42; 180/443, 180/402, 403

(56) References Cited

U.S. PATENT DOCUMENTS

| | | | |
|---|---|---|---|
| 5,020,618 A | 6/1991 | Nagao | |
| 5,263,321 A * | 11/1993 | Thomsen et al. | ............. 60/384 |
| 5,275,251 A | 1/1994 | Thomsen et al. | |
| 5,549,173 A | 8/1996 | Tomita | |
| 5,596,498 A * | 1/1997 | Thomsen | ..................... 701/41 |
| 5,931,881 A | 8/1999 | Gustin et al. | |
| 6,098,296 A | 8/2000 | Perisho, Jr. et al. | |
| 6,256,893 B1 | 7/2001 | Forborgen | |
| 6,661,191 B2 * | 12/2003 | Zheng et al. | ................ 318/434 |
| 6,681,166 B2 * | 1/2004 | Kato et al. | .................... 701/41 |
| 6,763,293 B2 * | 7/2004 | Dilger | ......................... 701/41 |
| 2003/0088351 A1 * | 5/2003 | Augustine et al. | ............ 701/41 |

FOREIGN PATENT DOCUMENTS

| | | |
|---|---|---|
| DE | 197 54 916 a1 | 6/1998 |
| EP | 407 768 B1 | 12/1993 |
| EP | 0 809 167 B1 | 10/2000 |

* cited by examiner

*Primary Examiner*—Michael J. Zanelli

(57) ABSTRACT

A method for steering a vehicle, in which a steering motor (4) is activated in dependence of the activation of a steering member (1), a steering motor angle and a steering member angle are detected and an error in the correlation between the steering member (1) and the steering motor (4) is compensated, stored data being used for the compensation of the error. Further, the invention concerns a steering arrangement (100).

19 Claims, 3 Drawing Sheets

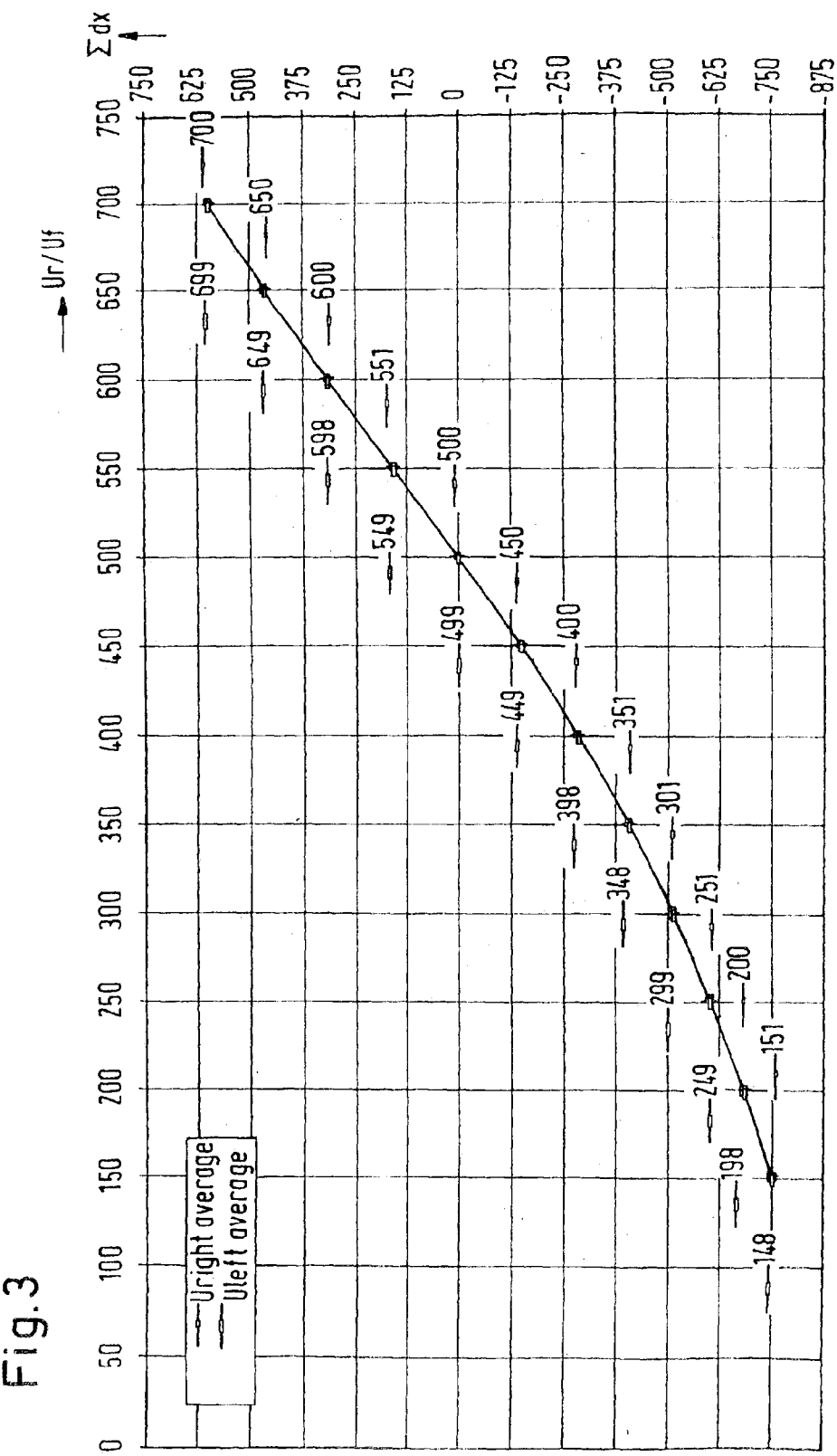

VEHICLE STEERING SYSTEM AND METHOD OF STEERING

BACKGROUND OF THE INVENTION

Conventional steering arrangements include a steering motor, having a steering motor angle sensor, a steering member, having a steering member angle sensor, and a compensation device, which controls a control system in dependence of signals from the steering motor angle sensor and the steering member angle sensor. A method and a steering arrangement of this kind are known from U.S. Pat. No. 5,549,173.

Steering handwheels with buttons are also available, whose "real" position is very important, in order that the operator can always reach the buttons correctly. The buttons are operating elements, with which certain functions can be triggered.

Of course, the same also applies for other vehicles, for example boats or aircraft, in which the steering member is in the form of a steering handwheel or a joystick. In all these cases, it is desired to give the operator or the driver information about the position of the steered element of the vehicle. This also applies, when the steering member, for example the steering handwheel, must perform more than one rotation to achieve complete utilisation of the angle area of the steering motor. In this case, the neutral position will be passed more than once. In one position of the steering handwheel, however, the neutral position should correspond to the neutral position of the steered wheels.

In such steering systems, errors occur, which may cause that the neutral position of the steering member no longer corresponds with the straightforward position of the steered wheel. In systems, which comprise a hydraulic steering, such errors may be caused by the fact that hydraulic components have a leakage. Other reasons for deviations in the conformance are wear phenomenon, which, for example, occur in knuckle joints.

Therefore, U.S. Pat. No. 5,549,173, mentioned in the introduction discloses a compensation of deviations occurring between the position of the steering member and the position of the steering motor. For this purpose, data are stored in a table, which can change the active connection between the signal of the steering member and the effect of the steering motor, depending on differences between the steering motor angle and the steering member angle. For example, the steering motor can be moved in the normal direction. However, it can also be stopped, or even moved in the opposite direction.

From older publications, for example DE 40 42 153 C2 or DE 40 42 151 C2, it is known, with a hydraulic steering to either increase or reduce the flow of the hydraulic fluid for the compensation of such a steering angle error, to re-establish a concordance between the steering motor angle and the steering member angle.

In the known cases, however, it is only possible to compensate the steering angle error, that is, the deviation between the steering member angle and the steering motor angle at certain spots. Faults caused by leakages or slip, which occur at other spots, for example between a steering handwheel and a steering column or in a connection to a steering unit cannot be compensated.

It is therefore a primary objective of this invention to improve the steering of a vehicle.

SUMMARY OF THE INVENTION

The invention concerns a method for steering a vehicle, in which a steering motor is activated in dependence of an activation of a steering member, a steering motor angle and a steering member angle are determined and an error in the correlation between the steering member and the steering motor is compensated, for which compensation of the error stored data are used.

For reasons of simplicity, the invention will be described on the basis of a wheeled vehicle, for example a three-wheel forklift truck, whose steering member is a steering handwheel. Such a steering handwheel usually has a knob or some other conspicuous marking, which shows, when the steered wheel is in the neutral position, that is, the position, in which the vehicle drives straight forward. In another alternative the steering handwheel has an asymmetric shape, to facilitate the operation for the driver. Basically, it is desired to achieve that a predetermined angle position of the steering handwheel is allocated to a predetermined angle position of the steered wheel.

With such a method, the vehicle steering task is solved in that the data are collected through a calibration routine, which reflects a concordance between the steering motor angle and the steering member angle.

Thus, it is no longer necessary to work with predetermined data. In certain situations, such predetermined data may be sufficient as basis for the compensation of the steering angle error. When, however, displacements or changes in components of the steering system occur, these data are no longer valid. This disadvantage is avoided in that a calibration routine is performed, which re-determines the data by means of the actual steering system. It namely reflects a concordance between the steering motor angle and the steering member angle. When this relation is determined from time to time, a reliable tool is available, by means of which the compensation of the steering angle error can be compensated. In this connection, all disturbances are recognised, which may occur between the steering motor angle and the steering member angle, that is, also disturbances, which occur before or after the steering arrangement. The calibration routine can be performed in the vehicle itself. Thus, it is no longer necessary to mount or dismount components to perform the calibration. Likewise, it is not required to readjust or reset the sensors. It is only necessary to know, when the vehicle drives straight forward. The calibration simply occurs in that data are inserted and, under certain circumstances, changed. This again causes that the costs of the calibration can be kept extremely small. This is particularly the case, when the calibration routine can run automatically, for example, controlled by a programme. The calibration can, for example, run at predetermined times or according to need. A need can be established on the basis of positioning errors. The error mentioned in the introduction is a positioning error. An additional advantage is that a replacement of components is not disturbing, but is taken into consideration during the calibration. For example, the steering cylinder or the steering unit can be replaced without causing the need for complicated adjustments.

Further, the calibration routine runs when starting a vehicle. This does not necessarily mean every start of the vehicle. When the calibration routine runs frequently, the changes, which have occurred since the latest calibration routine are recognised quickly and reliably, and can be considered in connection with the next compensation of steering angle errors. As the changes, which occur between two calibration routines, are usually only small, appreciable negative changes of the driving behaviour of the vehicle are hardly involved.

Further, the steering motor angle is used as master value for the calibration routine. Contrary to the normal driving operation of the vehicle, during which the steering member angle is used as master value, the steering motor angle is used here to establish the steering member angle (or a value derived from this), which belongs to the steering motor angle. During the following operation of the vehicle, this method again makes it easier to let the compensation run in the opposite direction, that is to let the steering motor angle be guided by the steering member angle.

Also, the data are stored in a table. Usually, a table is a reserved file area, in which data having a predetermined structure are stored. Arranging the data in a table involves the advantage that they are well arranged, and the data can be found again easily and, above all, quickly. During steering the quick finding of relevant data is of a certain importance, to keep the delay times during steering of a vehicle small.

In addition, the possible steering motor angle is divided into a predetermined number of intervals, and values, which are allocated to an interval, are stored in one row of the table. The division can also be made by way of calculation, for example in a programme. The possible steering motor angle is the total angle, which the steered member can travel. With a three-wheel forklift truck, this steering angle can, for example, be 360°. In principle, the number of intervals can be selected at random. Preferred are 5 to 50 intervals, and a particularly preferred number is 20 intervals. When selecting a too small number of intervals, the disintegration is not sufficient. When selecting a too high number of intervals, the table will be too large and also the number of RAM-circuits will be very large, which may have a negative influence on the costs. The intervals do not necessarily have to be equal. Already after passing a few intervals, sufficient information for compensation will at any rate be available for a sufficient area.

Further, a calibration of an interval is finished, when the steering motor angle exceeds an interval border. Thus, the intervals are defined by their borders. When a border is exceeded, it is established, which movement the steering member has performed. In the case of a steering handwheel, for example, the angle can be established, which the steering handwheel has travelled from an original position, for example, since exceeding the border of the previous interval. By and by, this gives an allocation between the steering motor angle and the steering member angle. It may be necessary also to consider that a complete turning of the steered wheels will require more than one rotation of the steering handwheel, for example 4 rotations. In this connection, it can at the same time be considered that the data of the sensors are possibly not directly available in the angle form, but have been analogically/digitally converted. In this case, exceeding the interval borders can simply be established by means of number comparisons. With this method, calibration can be made during operation of the vehicle, for example in a time section, which follows right after the start of the vehicle. Here, it is utilised that during operation of the vehicle the steering member is activated and the steering motor follows. In this way, a sufficient exceeding of interval borders is achieved by the steering motor, with which the position or the angle of the steering member can be established.

The calibration is not or not completely carried through, when external conditions change when passing an interval. Thus, discontinuities can be avoided, which occur, for example, because of a backward movement of the steering member or during build-up times for pressures. During pressure build-up, for instance, a hysterisis could occur, for example because of the tyres, whose rubber is compressed, which causes a pressure to be trapped. Oil may, for example, contain air, or, after an oil change a different compressibility of the oil appears. Thus, it is monitored, if the increment, with which the steering member angle is changed, is always only positive or only negative.

It is preferred that the table is empty at the beginning of the calibration routine. Of course, such information is excepted, which is required to maintain the order of the table, for example, the interval borders or other order values, such as row numbers. When the table is empty at the beginning of a calibration routine, it is most easy to monitor, whether or not all required data for the calibration have already been collected. Thus, data are not just overwritten; they are deleted before the beginning of the calibration.

The calibration is performed in dependence of the direction, in which the steering member is moved. Thus, it is distinguished, if the vehicle is driven to the right or to the left. In both cases, different errors can certainly occur, which are considered by this method.

In addition, the calibration is only carried through, when the steering member has been moved by a predetermined area. This can most easily be described on the basis of a hydraulic steering. Here, the slide set must be turned by a predetermined angle, for example +2.5°, before a pressure build-up. Additionally, a margin of, for example, +12.5° can be introduced before starting the calibration, to have a certain security area. Thus, the calibration is not started, until the steering handwheel has been turned by +15°. This angle is still relatively small. This can be achieved without problems by the operator at the beginning of the operation of the vehicle. When the angle is selected to be too large, this may have a negative influence on the calibration duration. When the calibration duration is too short, also the calibration itself can be influenced negatively. In principle, in connection with a steering handwheel, angles in the dimension from about 5 to 45° can be imagined, which must be awaited, before data for the calibration are evaluated.

Preferably, the sensors are scanned during calibration with a scanning frequency in the area of 10 to 100 Hz. This is a relatively high scanning frequency. With 50 Hz, for example, scanning is made every 20 milliseconds. In this short period, neither the steering member nor the steering handwheel has been moved by a large angle. Thus, the exceeding of an interval border can be determined with a high reliability.

The shortcomings of the prior art are solved herein in that a steering system adaptation arrangement is connected in series with the compensation device. The steering system adaptation arrangement permits the adaptation of the compensation of the steering angle error to the concrete steering system. In certain cases, such a steering system adaptation arrangement can also be used with different steering systems. The steering system adaptation arrangement in fact permits carrying through the compensation of the steering angle error in dependence of the errors occurring in the system.

The steering system adaptation arrangement of this invention is adaptable to the steering arrangement at predetermined times. This gives repeated opportunities of updating the steering system adaptation arrangement and controlling the compensation device in dependence of the errors occurring in the steering arrangement. Also, the steering system adaptation arrangement has a table, which has a row for each interval of the steering motor angle.

As explained above in connection with the method, the maximum possible steering motor angle is divided into a predetermined number of intervals. The data for each interval is stored in a row of the table. Further, the table has separate columns for different movement directions of the steering member. This facilitates the order, when managing the data. The terms "row" and "column" can be replaced, that is, a table can of course also be mirrored at its diagonal, without losing the information.

Also, the steering system adaptation arrangement has two inlets; of which one inlet is connected with the steering motor angle sensor as master inlet and the other inlet is connected with the steering member angle sensor as slave inlet. Thus, the steering system adaptation arrangement checks, which values the steering member angle sensor shows, when the steering motor angle sensor has reached predetermined values, for example the exceeding of interval borders. This permits a relatively fast and simple identification of the correlation between the steering motor angle and the steering member angle. When these values have then been stored in the table, and intermediary values are needed later, the corresponding related values can be determined by means of a simple interpolation. Preferably, a position change arrangement is arranged between the steering member angle sensor and the steering system adaptation arrangement. The position change arrangement processes the data of the steering member angle sensor.

Preferably, a connection branches off between the steering member angle sensor and the compensation device before the position change arrangement. Thus, the angle of the steering member angle sensor is led direct to the compensation device, whereas the angle of the steering motor angle sensor is processed by the steering system adaptation arrangement before reaching the compensation device.

BRIEF DESCRIPTION OF THE DRAWINGS

FIG. 3 is a correlation of data between data for a steering motor angle and a steering member angle.

DESCRIPTION OF THE PREFERRED EMBODIMENT

Figure 1:
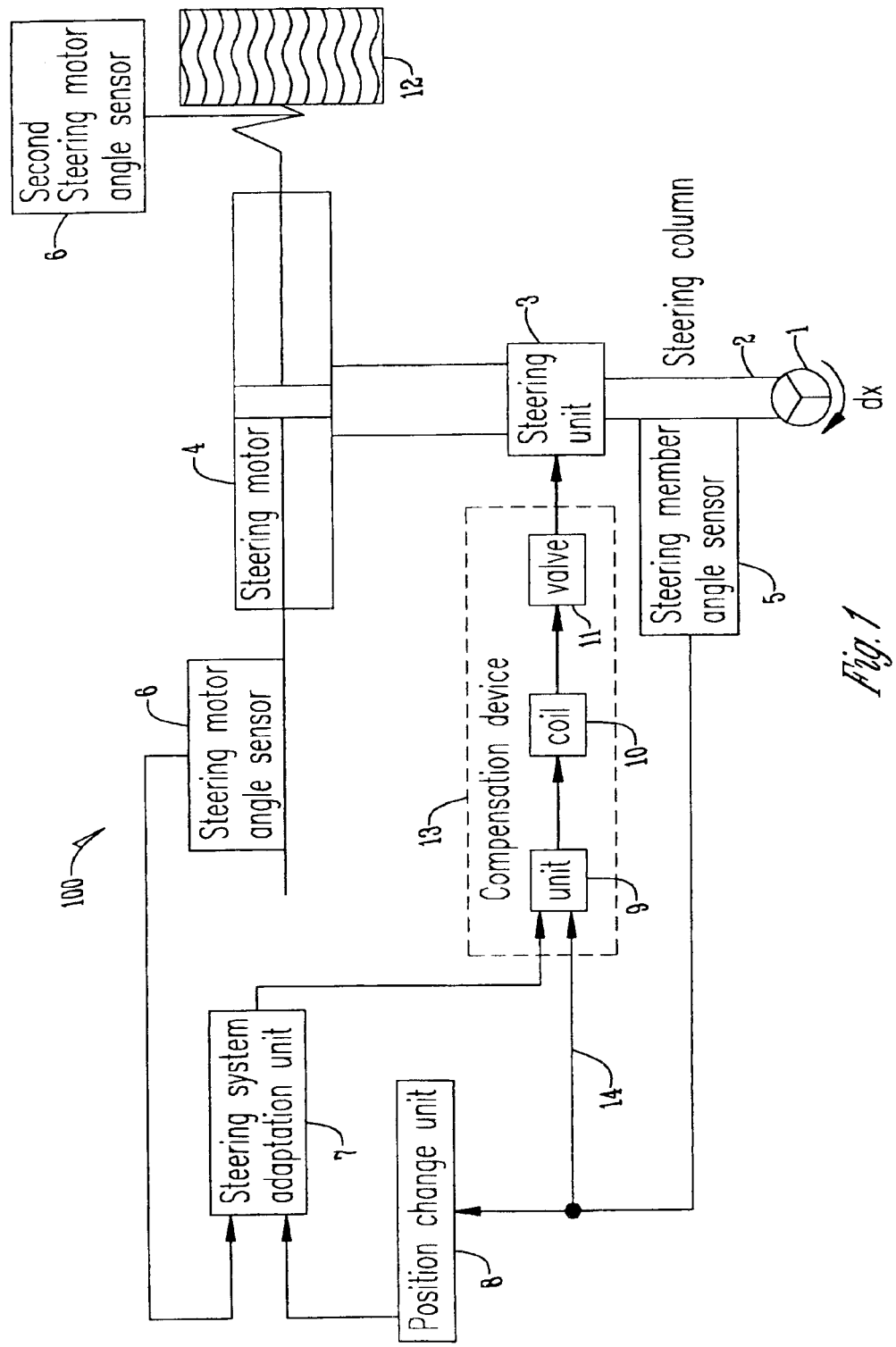
FIG. 1 is a schematic view of the steering arrangement of this invention.

FIG. 1 is a schematic view of a steering arrangement 100 with a steering handwheel 1 as steering member, which is connected with a steering column 2. The steering column is connected with a steering unit 3, which, in the present embodiment, is in the form of a hydraulic steering unit 3. The steering unit 3 is connected with a steering motor 4 in the form of a steering cylinder.

In the present embodiment, the steering arrangement 100 is a fully hydraulic steering arrangement, that is, there is no mechanical active connection between the steering handwheel 2 and the steering motor 4. In a manner known per se and not shown in detail, firstly a flow amount section is provided in the steering unit 3, which, in dependence of the turning of the steering handwheel 2 lets a certain amount of oil reach the steering motor 4. Connected in series with the flow amount section is a directional section, which controls by means of valves or otherwise, which side of the steering motor 4 is to be supplied with the pressurised hydraulic oil.

At the steering column 2 (or at another suitable spot, for example in the steering handwheel or at the steering unit) is arranged a steering member angle sensor 5, which determines, by which angle increment dx the steering handwheel 1 is turned. Preferably, the steering member angle sensor 5 is an incremental sensor, that is, it monitors the increase or the decrease of the steering angle increment dx. Thus, it is possible also to monitor the turning of the steering handwheel 1, when the steering handwheel 1 has to perform more than one rotation, for example four rotations, for a full deflection of the steering motor 4.

In a similar manner, a steering motor angle sensor 6 is arranged at the steering motor 4, which detects a movement of the steering motor 4. As the steering motor 4 usually performs an angle displacement of a steering element, for example a steered wheel, it is, for reasons of simplicity, assumed that the steering motor angle sensor 6 detects a steering motor angle.

Alternatively, also a steering motor angle sensor 6' can be provided, which can be arranged direct at the steered member, for example a wheel 12, and detects the turning of this wheel 12. Thus, it is also possible to detect inaccuracies, which occur through the connection between the wheel 12 and the steering motor 4.

In the present embodiment, the sensors 5, 6, 6' are absolute sensors. In principle, however, it is possible to use all kinds of sensors, which permit a measuring of steering handwheel turning and steering motor deflection.

The signals of the two sensors 5, 6 are led to a steering system adaptation unit 7. The steering system adaptation unit 7 will be explained further below. Between the steering system adaptation unit 7 and the steering member angle sensor 5 is further arranged a position change unit 8, which processes the signal of the steering member angle sensor 5, before it is led to the steering system adaptation unit 7. Here, the steering system adaptation unit 7 is shown as a mechanical component. Preferably, it can also be realised in the form of software, as a routine or a programme.

This also simplifies the adaptation to sensors. According to their design, sensors can, for example, supply either increasing or decreasing values, when reporting an angle change.

The control of the steering unit 3 does not take place directly, but on the basis of the output signals of the sensors 5, 6 via a compensation device 13. The compensation device 13 is connected with the steering system adaptation unit 7 on the one side and the steering member angle sensor 5 on the other side. For this purpose, a line 14 expediently branches off between the steering member angle sensor 5 and the position change arrangement 8.

The compensation device 13 comprises known elements, for example, a unit 9, which calculates, when compensation is required, a coil 10 and a valve 11, which carry through the physical compensation and, for example, supplies the steering unit 3 with more or less hydraulic fluid. One possibility of the compensation is described in DE 40 42 151 C2, in which the elements 10, 11 release or close auxiliary fluid paths. Thus, it is possible to make the position of the steering handwheel 1 correspond to the position of the steering motor 4 during operation.

By means of the steering system adaptation arrangement, it is now possible to calibrate the steering arrangement 100 repeatedly. Expediently, a calibration occurs at each start of the steering arrangement 100. Every time the vehicle, which is equipped with the steering arrangement 100, starts, a calibration occurs, which ensures that, for example a wear, which has occurred since the latest start, is always taken into consideration.

Figure 2:
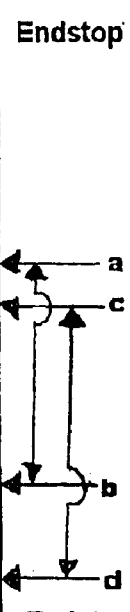
FIG. 2 is a calibration table relevant to the invention.

The steering system adaptation unit 7 comprises a table, which is shown in a partly completed form in FIG. 2.

The maximum possible angle of the steering motor 4 is divided into twenty intervals. The sensor must not make this division. It can also be done in the steering system adaptation unit 7. The steering motor angle sensor 6 divides the maximum steering motor angle into 1,000 increments, so that with a division into 20 intervals, borders for each multiple of 50 are achieved. These borders are fixedly stored in a column Uc. Otherwise, the table is empty or prepared for overwriting at the beginning of the calibration.

The steering motor angle sensor 6 is now scanned with a frequency of, for example, 50 Hz, that is, every 20 milliseconds new information about the deflection and thus the actual position of the steering motor 4 is received. Due to a limited speed, the steering motor cannot carry through very large angle changes during this relatively short period. With a large number of intervals, the higher frequency and with a smaller number of intervals a lower frequency will be selected. Thus, a relatively reliable statement is achieved concerning the moment of passing a border between intervals. For example, the steering motor angle sensor 6 can jump from 499 to 501 from one scanning time to the next. Exceeding an interval border is considered to be a condition for the calibration of an interval.

In this connection, a straightforward position is the basis, in which the steering motor 4 is in the area of the centre of its middle deflection, in the present case, that is, at 450 or 500. These two intervals shown as area e in FIG. 2.

A condition for the calibration in an interval is that this interval has not previously been calibrated and the steering motor angle has exceeded the interval border, that is, has reached an interval n+1 or n−1 from an interval n. It must also be considered here that the direction of the exceeding is important. When exceeding in the upward direction, merely the columns are updated, which are provided with the index r (r for raising). With a downward movement, the columns are updated, which are provided with the index f (f for falling).

In the columns Sr and Sf, state variables are stored. These state variables can have the following four values:

| | |
|---|---|
| Wait: | This interval has not yet been calibrated. |
| Start: | The calibration is going on at present. |
| Stop: | The calibration for this interval has partly been finished. |
| Lock: | The calibration for this interval is completely finished. |

When the calibration in an interval has started, that is, after exceeding the interval border, the steering angle increments dx detected by the steering member angle sensor 5 are summed up and stored in the column Σdxr. Here, it depends on whether the steering handwheel angle increases or decreases. However, during the calibration of an interval, the steering angle increment must be either positive or negative. This is monitored by a position change arrangement 8 (which can also be a software routine). The strict observance of this condition prevents that small backward movements of the steering handwheel or discontinuities, which can occur through a pressure build-up time, can influence the calibration negatively. This means that in case of such a discontinuity, the state variable Sr or Sf for this interval will be returned to "wait".

When the next interval border is exceeded, there is a kinematic correlation between the accumulated steering angle increments dx and the corresponding positions of the steering motor angle, which has been determined by the sensor 6. It must be noted that during calibration the steering motor angle is the master value, which is followed by the steering member angle. Thus, for defined increments of the steering motor 4, the corresponding actual angles of the steering handwheel 1 are achieved. After passing an interval, the sum of the angle increments is transferred to the column Xr or Xf, respectively, and here added to the already stored value Xr or Xf, respectively, of the previous interval. Then, the state variable Sr or Sf, respectively, is set at "lock".

Simultaneously with the calibration, the contents of the table in the columns Sr and Sf are monitored to find out whether the full kinematic relation between the movement of the steering handwheel 1 and the steering motor 4 can be described. This is achieved by rearranging the table contents through moving of the data from the column Σdxr to Xr and Σdxf to Xf.

The calibration begins at the rows, which are shown at e in FIG. 2. Here, it is assumed that in this area the vehicle drives straight forward. Four indicators a, b, c and d are defined, which initially point towards this zone shown at e of the table in FIG. 2. The zone shown at e is situated by 50% of the maximum deflection angle of the steering motor 4.

When the state variable Sr (a) is equal to start and the state variable Sr (a+1) is stop, then Σdxr (a) and Xr (a+1) are added in the field Xr (a). The counter "a" is reduced by one to get to the next lower interval.

When the state variable Sr (b) is equal to start and the state variable Sr (b−1) is stop, then Σdxr (b) and Xr (b) are added in the field Xr (b+1). The indicator "b" is increased by 1 to point to the row above. The same procedure is used for Sf and Xf for the indicators c and d.

The kinematic relation now occurs between the columns Ur and Xr and extends from row a to row b, and between the columns Uf and Xf, which extends from the row c to d.

In dependence of the algebraic sign of the movement of the steering handwheel 1, the steering handwheel deviation can now be calculated, meaning that the kinematic relation can be described using the columns Xr or Xf. Such a relation is shown in FIG. 3. Here, the curves for a left movement of the steering handwheel 1 and a right movement of the steering handwheel 1 are practically concurrent. In order to clarify small differences, the deviations of neighbouring intervals are shown next to individual intersection points. FIG. 3 shows the relation between the steering motor angle (horizontal or x-axis) and the steering handwheel angle (vertical or y-axis).

The steering motor 4 has only a limited working area, which can, for example, be bordered by end stops. The design of these endstops does not necessarily have to be symmetrical. For this reason, FIG. 3 shows a possible movement from −750 to +625.

Before starting the calibration, there is a "delay", as a slip in the longitudinal column 2, a delay of the pressure build-up, an opening of the slide set and other discontinuities are not permitted to influence the calibration. In the present embodiment, the slide set of the steering unit 3 must be turned by approximately 2.5° before a pressure build-up, and an additional security area of 12.5° must be introduced before starting the calibration, so that the calibration in the present embodiment starts after a turning of the steering handwheel 1 by 15°. 15° is a relatively small angle, so that the calibration can begin shortly after the start, when at the beginning the operator performs smaller movements at the steering handwheel.

At the beginning of the operation of the vehicle, when the calibration table (FIG. 2) is still empty, an optimum driving behaviour will, under certain circumstances, not appear.

Already after a relatively short operation duration, that is, after some curve driving, all angle areas of the steering motor 4 have been passed, so that the table is filled and the actual state of the relation between the steering member angle and the steering motor angle can be shown.

When this relation has been determined, the actual conditions of the relation can be used to cause the compensation in the steering unit 3 by means of the compensation unit 13.

In a linear system, the curve would in fact be a straight line, that is, a linear correlation between the steering handwheel angle and the steering motor angle. In the situation shown in FIG. 3, a sensor 6' is used, which is arranged direct at the steered wheel. As here also transfer mechanisms between the steering motor 4 and the steered wheel play a part, the correlation is clearly not linear.

The structure of the table is random. Basis is in the starting point shown at e. Then, it is a question about the direction, in which the driver turns the steering handwheel. Xr, Xf are initially built up from zero, that is, from the neutral position. When a transfer to Xr, Xf has taken place, the state variable is switched to lock. FIG. 2 additionally shows the indicators a to d. In the example, the indicators a, b point to the borders of the areas, between which a calibration has occurred. The same applies for the indicators c, d. In these areas compensation can then take place. Compensation only takes place, when the steering handwheel is turned and the compensation depends on the size of the error.

A fully hydraulic steering is shown. However, it is obvious that in principle the method can be used with all steerings, particularly with such having no mechanical active connection between a steering handwheel and the steered wheel. Such steerings can, for example, also be electrical.

It is therefore seen that this invention will achieve at least all its stated objectives.

What is claimed is:

1. A method for steering a vehicle, in which a steering motor is activated in dependence of an activation of a steering member, a steering motor angle and a steering member angle are determined and an error in the correlation between the steering member and the steering motor is compensated, characterised in that data are updated and collected through a calibration routine, which reflects a concordance between the steering motor angle and the steering member angle during operation of the vehicle, and for which the data is used to compensate for the error in the correlation between the steering member and the steering motor.

2. A method according to claim 1, characterised in that the calibration routine runs when starting a vehicle.

3. The method according to claim 1, characterised in that the steering motor angle is used as master value for the calibration routine.

4. The method according to claim 1, characterised in that the data are stored in a table.

5. The method according to claim 4, characterised in that the possible steering motor angle is divided into a predetermined number of intervals, and values, which are allocated to an interval, are stored in one row of the table.

6. The method according to claim 5, characterised in that a calibration of an interval is finished, when the steering motor angle exceeds an interval border.

7. The method according to claim 5, characterised in that the calibration is not or not completely carried through, when external conditions change when passing an interval.

8. The method according to claim 4, characterised in that the table is empty at the beginning of the calibration routine.

9. The method according to claim 1, characterised in that a calibration is performed in dependence of the direction, in which the steering member is moved.

10. The method according to claim 1, characterised in that the calibration is only carried through, when the steering member has been moved by a predetermined area.

11. The method according to claim 1, characterised in that the steering motor angle and steering member angle are determined via scanning during calibration with a scanning frequency in the area of 10 to 100 Hz.

12. A steering system with a steering motor, having a steering motor angle sensor, a steering member, having a steering member angle sensor, and a compensation device, which controls a control system in dependence of signals from the steering motor angle sensor and the steering member angle sensor, characterised in that a steering system adaptation arrangement (7) is connected in series with the compensation device (13), and wherein the steering system adaptation arrangement (7) has a table, which comprises a row for each interval of the steering motor angle.

13. The steering system according to claim 12, characterised in that the steering system adaptation arrangement (7) is adaptable to the steering arrangement (100) at predetermined times.

14. The steering system according to claim 12, characterised in that the table has separate columns for different movement directions of the steering member (1).

15. The steering system according to claim 12, characterised in that the steering system adaptation arrangement (7) has two inlets, of which one inlet is connected with the steering motor angle sensor (6, 6') as master inlet and the other inlet is connected with the steering member angle sensor (5) as slave inlet.

16. The steering system according to claim 15, characterised in that a position change arrangement (8) is arranged between the steering member angle sensor (5) and the steering system adaptation arrangement (7).

17. The steering system according to claim 16, characterised in that a connection branches off between the steering member angle sensor and the compensation device (13) before the position change arrangement (8).

18. A steering system with a steering motor, having a steering motor angle sensor, a steering member, having a steering member angle sensor, and a compensation device, which controls a control system in dependence of signals from the steering motor angle sensor and the steering member angle sensor, characterised in that:

a steering system adaptation arrangement (7) is connected in series with the compensation device (13);

the steering system adaptation arrangement (7) has two inlets, of which one inlet is connected with the steering motor angle sensor (6, 6') as master inlet and the other inlet is connected with the steering member angle sensor (5) as slave inlet; and the compensation device (13) has two inlets, of which one inlet is connected with the steering system adaptation arrangement (7) and the other inlet is connected with the steering member angle sensor (5).

19. The steering system according to claim 18, characterised in that the steering system adaptation arrangement (7) has a table, which comprises a row for each interval of the steering motor angle.

* * * * *